A. R. WYLIE & J. G. WRIGHT.
VEHICLE WHEEL.
APPLICATION FILED JUNE 7, 1910.

1,005,400.  Patented Oct. 10, 1911.

WITNESSES:
W. M. Parham
J S Murray

INVENTORS
Alfred R. Wylie
James G. Wright
BY John M. Spellman
ATTORNEY

UNITED STATES PATENT OFFICE.

ALFRED R. WYLIE AND JAMES G. WRIGHT, OF BIG SPRING, TEXAS.

VEHICLE-WHEEL.

1,005,400. Specification of Letters Patent. Patented Oct. 10, 1911.

Application filed June 7, 1910. Serial No. 565,587.

*To all whom it may concern:*

Be it known that we, ALFRED R. WYLIE and JAMES G. WRIGHT, citizens of the United States, residing at Big Spring, in the county of Howard and State of Texas, have invented certain new and useful Improvements in Vehicle-Wheels, of which the following is a specification.

Our invention relates to new and useful improvements in vehicle wheels, and more particularly automobile wheels. Its object is to provide a vehicle wheel provided with a substitute for the pneumatic tire of a cheaper and more lasting construction than such a tire.

A further object is to provide a vehicle wheel in which the shocks and jars imparted to the rim will be taken up by a plurality of springs mounted radially from the hub.

A still further object is to provide resilient means for transmitting the rotation of the hub to the outer portions of the wheel and to provide means to reduce the friction imparted to the wheel such as it undergoes in turning corners.

Finally the object of the invention is to provide a device of the character described that will be strong, durable, simple and efficient and comparatively easy to construct and one, the various parts of which will not be likely to get out of working order.

Figure 1:
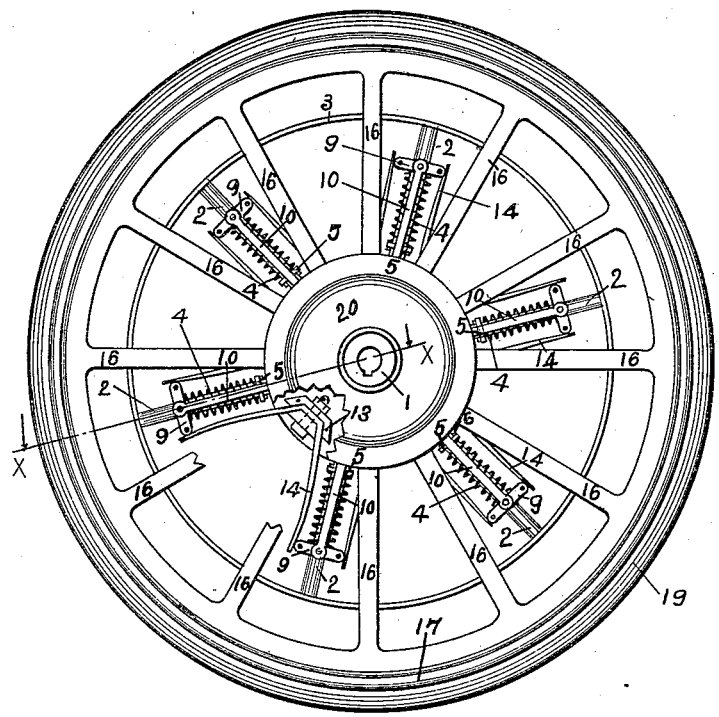
Figure 2:
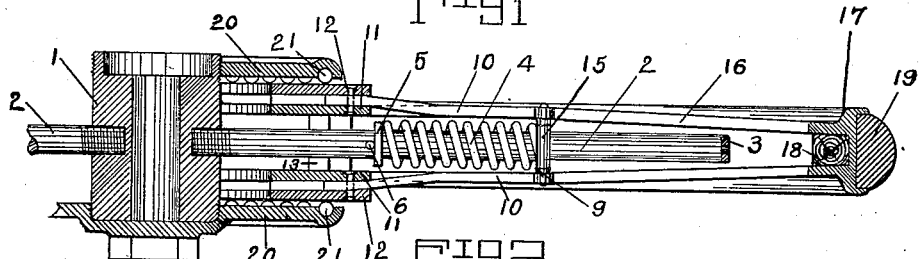
Figure 3:
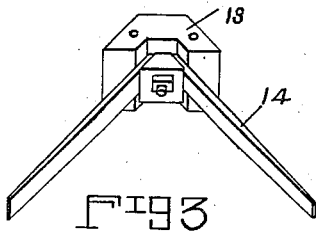
Figure 4:
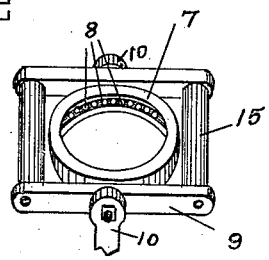

With these and various other objects in view, our invention has relation to certain novel features of construction and operation an example of which is described in the following specification and illustrated in the accompanying drawing, wherein:

Figure 1 is a side elevation of the wheel part of the structure being broken away. Fig. 2 is a transverse sectional view taken on the line *x—x* of Fig. 1 showing half the wheel. Fig. 3 is a perspective view of the resilient means employed to transmit the rotation from the hub to the outer parts of the wheel. Fig. 4 is a perspective view of a ball-bearing collar and a frame in which the same is mounted, the frame being provided with a roller at each extremity. The purpose of this construction is made clear hereinafter.

Referring now more particularly to the drawing wherein like numerals of reference designate similar parts in all the figures, the numeral 1 denotes the central hub of the wheel and 2 a plurality of circular rods projecting radially therefrom. The extremities of these rods are connected by a ring 3 adding to their strength and rigidity. Upon each of the rods 2 is mounted a coiled spring 4, the inner extremity of which bears against a washer 5 restricted from inward displacement by a pin 6. The outer extremities of these springs bear against collars 7 provided with ball bearings 8, which collars are slidably mounted upon the rods 2. Each of these collars is pivotally mounted between a pair of arms 9, which arms are transversely mounted upon the outer extremities of the radial bars 10 arranged in pairs. The inner extremity of each of these radial bars is pivotally mounted between inner rings 11 and outer rings 12. Between the inner rings 11 a plurality of blocks 13 are rigidly mounted equidistantly between the rods. To each of these blocks is rigidly secured the apex of a V-shaped spring 14. The outer extremities of the springs 14 bear against rollers 15 which are mounted between the arms 9 at the two extremities of said arms. A plurality of spokes 16 project integrally from each of the rings 11, the outer extremities of said spokes being secured by any suitable means to a felly 17. The felly 17 will preferably be of metal, and a wooden felly 18 may be used in conjunction therewith in order to take up the vibration imparted to the metallic felly and to reduce the noise. A solid rubber tire may be mounted upon the felly 17 as indicated by the numeral 19. Upon each of the hubs 1 is threaded a circular plate 20 provided with a ball-race near its outer rim to receive ball bearings 21.

This wheel may be considered to consist of two separate rigid frames capable of relative motion in regard to each other, the coiled springs 4 serving to communicate this motion from one frame to the other. One of these frames consists of the hub 1 carrying the disks 20 upon its ends and the rods 2 projecting radially from said hub. The other frame is composed of the felly 17 with its rubber tire, the spokes 16, the rings 11 and 12 and the blocks 13 with their attached V-shaped springs 14.

When a shock is imparted to the bottom of this wheel an approximately upward displacement results of the larger outer frame relative to the smaller inner frame. This will produce a compression. An upward displacement will thus result in the case of each of the collars 7 whose supporting rod 2 is sufficiently near the vertical to permit a vertically acting impulse to displace said collars. This upward displacement of the collars 7 will produce a compression of the springs 4 upon the lower half of the wheel. In case the rods 2 carrying the collars 7 are horizontal or are far removed from the vertical, the upward displacement of the outer frame will not produce a sliding motion of the collars. In this case, however, the radial bars 10 will swing slightly about their pivotal supports in the rings 11 and 12 producing a compression of the V-shaped springs 14. Therefore, any shocks imparted to the outer frame will be transmitted to the inner frame through the springs 4 and 14 and these springs will serve to reduce the force of the shocks in the same manner that the pneumatic tire acts to accomplish the same result. The springs 14 serve to communicate a rotary impulse from either the inner frame to the outer one or vice versa according to whether the wheels are mounted upon the rear driving axle or are mounted free upon the front axle of the automobile.

By means of the plates 20 and the ball bearings 21 the side thrust which comes into play when the vehicle upon which this wheel is mounted turns a corner is counteracted with the least possible friction. The ball bearings prevent undue friction when the two component frames of the wheel undergo relative displacement.

The above described vehicle wheel is superior to wheels employing pneumatic tires in both economy and durability, and also in the quality of service given, since by eliminating the pneumatic tire there can be no punctures, blowouts or slipping.

What we claim is:

1. In a vehicle wheel, the combination with an inner frame including the hub and rods projecting radially therefrom; of an outer frame including the spokes and means connecting the inner extremities of the spokes, coiled springs mounted upon said radial rods, V-shaped springs mounted between the said connecting means for the inner extremities of the spokes, means bearing against the outer ends of the coiled springs and engaged by said V-shaped springs and connections between the spoke connecting means and the last means to communicate motion from one of the component frames to the other.

2. In a vehicle wheel, the combination with the rim, spokes and hub thereof, of rods projecting radially from the hub, a spring coiled upon each rod, rings connecting the inner extremities of the spokes, arms projecting radially from said rings and pivotally attached thereto, means by which a displacement may be communicated from the extremities of said arms to said coiled springs, V-shaped springs having their apices mounted between said rings, and means interposed between the outer extremities of the V-shaped springs and each of the radial rods.

3. In a vehicle wheel, the combination with the rim, spokes and hub thereof of rods projecting radially from the hub, a spring coiled upon each rod having its inner extremity restricted from inward displacement, a collar slidable upon each rod adjacent to the outer extremity of the spring thereupon, rings to which the inner extremity of the spokes are rigidly secured, radial arms having their inner extremities pivotally attached to the said rings and their outer extremities attached to said sliding collar and a resilient means for communicating rotation from the hub to said rings.

4. In a vehicle wheel, the combination with the rim, spokes and hub thereof, of rods projecting radially from the hub, a spring coiled upon each rod, a ring connecting the extremities of said rods, means preventing inward displacement of the inner extremities of the springs, a collar mounted upon each rod adjacent to the outer extremity of the spring thereupon, rings connecting the inner extremities of the spokes, radial bars having their inner extremities pivoted upon said rings and their outer extremities pivotally secured to said collars, and V-shaped springs having their apices rigidly mounted between said rings and their outer extremities bearing against said rods.

5. In a vehicle wheel, the combination with the rim, spokes and hub thereof, of a plurality of rods projecting radially from said hub, a ring connecting the outer extremities of the rods, a spring coiled upon each rod, having its inner extremity restricted from inward displacement, a collar slidable upon each rod adjacent to the outer extremity of the spring thereupon, rings to which the inner extremities of the spokes are secured, radial bars having their inner extremities pivoted to said rings and their outer extremities attached to said collars, V-shaped springs having their apices rigid between said rings, rollers mounted upon the outer extremities of said bars against which the outer extremities of the V-shaped springs bear, and disks mounted upon the hub at each extremity thereof preventing transverse displacement of said rings.

6. In a vehicle wheel, the combination with the rim, spokes and hub thereof, of rods projecting radially from the hub, a spring coiled upon each rod, rings to which the inner extremities of the spokes are secured, bars projecting radially from said rings having their inner extremities pivoted thereupon, rollers carried by the outer extremities of said bars, means connecting the outer extremities of the bars to the aforesaid springs so that a radial displacement of said bars will produce a tension in the springs, V-shaped springs mounted between said rings having their outer extremities bearing against said rollers, disks mounted upon the hub at each extremity thereof and ball bearings interposed between said disks and said rings.

In testimony whereof we have signed our names to this specification in the presence of two subscribing witnesses.

ALFRED R. WYLIE.
JAMES G. WRIGHT.

Witnesses:
J. S. MURRAY,
S. R. HICKMAN.

Copies of this patent may be obtained for five cents each, by addressing the "Commissioner of Patents, Washington, D. C."